United States Patent Office 3,557,544
Patented Jan. 26, 1971

3,557,544
COMPOSITIONS AND YARN MADE THEREFROM
Frank Holmes Simons, Matthews, N.C., assignor to Fiber Industries, Inc., a corporation of Delaware
Filed Mar. 9, 1967, Ser. No. 621,867
Int. Cl. D02g 3/02
U.S. Cl. 57—140
12 Claims

ABSTRACT OF THE DISCLOSURE

The copolymer of polyhexamethylene adipamide (nylon 66) and polycaprolactam (nylon 6) is produced by heating a blend of chips of the two polymers at a temperature less than the melting point of either of the polymeric materials while passing an inert gas over the chips. The water content in the chips is reduced to such an extent that the polymeric materials are no longer in equilibrium with their water of condensation. Upon melting the polymeric materials react with one another to form a copolymer and equilibrate rapidly to form a copolymer having a higher relative viscosity (RV).

---

Figure 1:
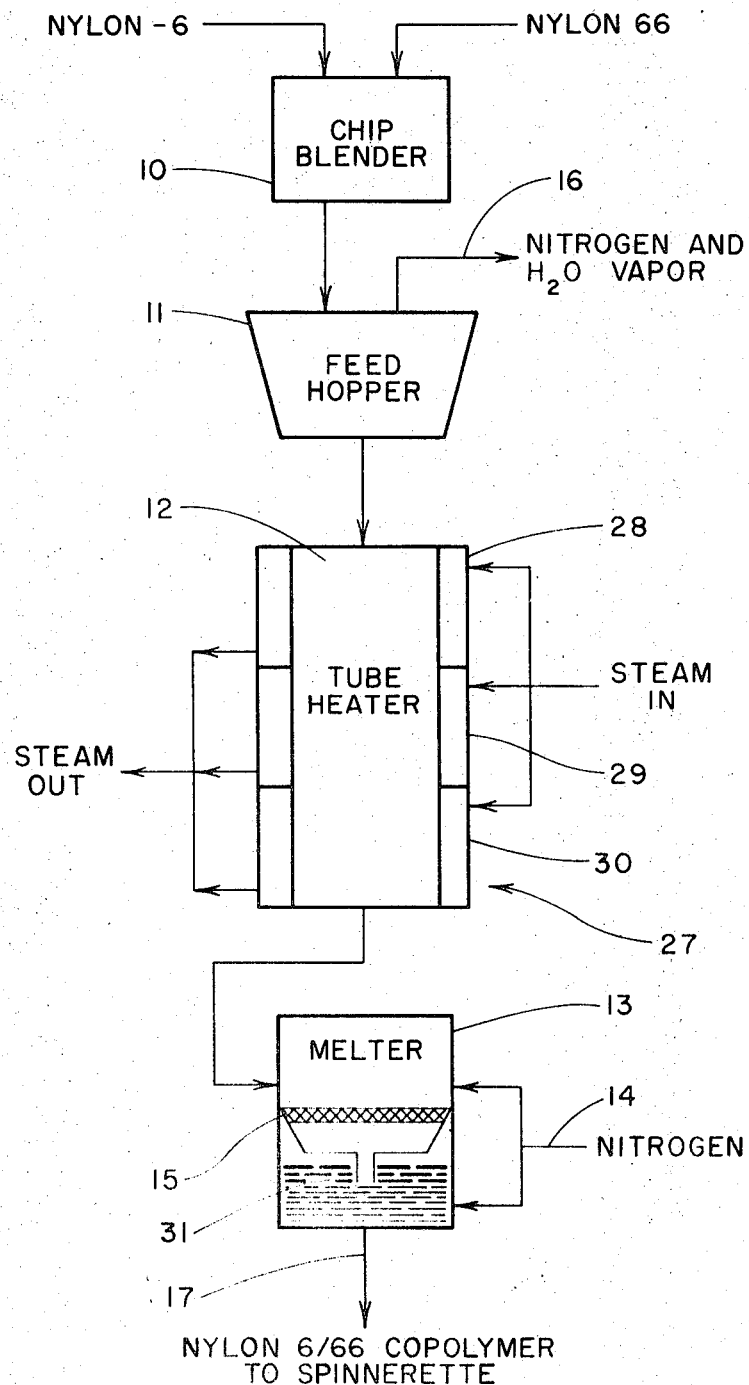

This invention relates to new compositions of matter and methods of preparing them and to articles embodying such compositions and methods of producing such articles. More particularly the present invention relates to improved linear copolyamides, to articles involving such copolyamides, and to methods of producing such improved copolyamides and articles.

The copolyamide is then spun under conditions of low moisture application and without steam conditioning. After several hours conditioning in a controlled humidity atmosphere the yarn is then drawn into a yarn having improved physical properties.

Alternatively, a copolymer is produced by heating together polyamide forming components, i.e., monomeric reactants, e.g., hexamethylene diammonium adipate and caprolactam under polymerizing conditions. In a further alternative a copolymer is produced by blending together two molten polyamide streams which are introduced, e.g., in an extruder.

STATEMENT OF THE PRIOR ART

In the United States Pats. 2,071,250, 2,071,251, 2,071,- 252, 2,071,253 and 2,130,948 there are disclosed various super polyamides. The polymers there described are high molecular weight products which are generally crystalline in structure showing X-ray powder diffraction patterns in the massive state, and which are capable of being cold drawn into fibers showing by characteristic X-ray patterns molecular orientation along the fiber axis. For the best fiber-forming properties the polymerization reaction should be continued until the intrinsic viscosity is at least 0.4. These polyamides, generally speaking, comprise the reaction product of a polyamide-forming composition in which the molecules are bifunctional and contain two amide-forming groups, each of which is complementary to an amide-forming group in other molecules in said composition.

The polyamides as defined above or as otherwise identified hereinafter can be obtained, for example, by self-polymerization of monoaminomonocarboxylic acids, or by reacting a diamine with a dibasic carboxylic acid in substantially equimolecular amounts, it being understood that reference herein to the amino acids, diamine, and dibasic carboxylic acids is intended to include the equivalent amide-forming derivatives thereof. Amide-forming derivatives of the amino acids include the ester, anhydride, amide, lactam, acid halide, N-formyl derivatives, carbamate and nitrile in the presence of water. Amide-forming derivatives of the dibasic carboxylic acids comprise the mono- and di-ester, the anhydride, the mono- and diamide, acid halide, and the following compounds in the presence of water: nitrile cyanocarboxylic acid, cyanoamide, and cyclic imide. Amide-forming derivatives of the diamines include the carbamate, N-formyl derivative and the N,N'- diformyl derivative.

On hydrolysis with hydrochloric acid and amino acid polymers yield the amino acid hydrochloride, and the diamine-dibasic acid polymers yield the diamine hydrochloride and the dibasic acid. Fibers derived from these products vary considerably in their properties depending on the reactants used in their preparation. However, they are all characterized by high tenacity, high orientation, lack of sensitivity to conditions of humidity, exceptionally good elastic recovery, extraordinary resistance to most solvents and chemical agents, good dyeing qualities and exceptionally good ageing characteristics in air even at moderately elevated temperatures.

While the term "polyamide" is inclusive of all polymeric materials which contain recurring amido groups, the term "nylon" is now accepted as a generic expression for those linear superpolyamides which may be fabricated into fibers. For many years, from the very beginning of the nylon industry in the United States and up until very recently, nylon production in this country was almost exclusively the polyamide derived from the condensation of hexamethylenediamine with adipic acid. This yields the so-called nylon 66. The latter illustrates one of the three fundamental methods for obtaining the nylon type products, namely, a condensation between a difunctional amine and a difunctional acid. The second method involves the self-condensation of an amino acid as illustrated by caprolactam which has relatively recently come into greater prominence in this country, having heretofore been rather more developed in some of the industrial areas of Europe. The polyamide derived from caprolactam (that is, ε-caprolactam) is designated as nylon 6. The third major class of nylons is actually a combination of the other two wherein products capable of self-condensation are polymerized with mixtures of diamines and dibasic acids. The possible combinations of diamines and dibasic acids as well as the number of amino acids suitable for condensation reactions is quite large, but from the practical point of view only those mentioned above in the manufacture of nylon 66 and nylon 6 have reached any degree of prominence due, in main, to the outstanding physical and chemical characteristics in these products as compared to those made from other diamines and dibasic acids and/or amino acids. It is with these last mentioned interpolymers, i.e., interpolymers of nylon 66/nylon 6 that the invention is subsequently with more particularity described.

In quest of polyamide compositions possessing a maximum of desirable attributes with a minimum of undesirable attributes workers in the art already have suggested, in addition to the third major class of nylons above-mentioned, the formation of products comprising mixtures of preformed polyamides. For example, in U.S. Pat. 2,193,529, which issued Mar. 12, 1940, Coffman discloses compositions comprising mixtures of different separately produced polyamides. It is pointed out in the disclosure of the patent that the melting point of such a mixture characteristically is higher than the average melting point of its component polyamides. According to the patentee the mixed polyamides, which may be nylon 66 and nylon 6, should not be confused with interpolymers, i.e., the so-called "true" interpolyamides, which are prepared by polymerizing a mixture of the monomeric reactants used in synthesizing the polymers. As also disclosed in the patent, the mechanical mixing of the polyamide results in a product which preserves to a large extent the superior attributes of the higher melting component. It is also known and such is deemed disclosed in U.S. Pat. 2,374,137 to Salisbury which issued Apr. 17, 1945 to the assignee of the above-referred to Coffman patent, that the components of such polyamide mixtures can be physically separated at least in substantial part and often completely by purely physical means.

Salisbury, as does Coffman, discloses the disadvantages of interpolymerizing two or more per se polyamide-forming ingredients e.g. diamine-dibasic acid combinations and/or amino acids. Interpolymers so formed have the structural units corresponding to the different starting ingredients in a random arrangement and have, according to the patentee, surprisingly low melting points, frequently lower than the melting points of any of the individual polyamides formed by separate polymerization of the said polyamide-forming ingredients. While it is true in certain instances that a low melting point copolymer may be advantageous, it is equally true in certain uses, e.g. tire cord, that it is not at all desirable to use filamentary material having a melting point much lower than that of conventional nylon 66.

The "semi-interpolyamides" in the last mentioned patent are formed by subjecting a substantially anhydrous mixture comprising a plurality of a preformed synthetic linear polyamides to heating in the molten state at amide-forming temperatures, for example, from 180 to 300° C., until the melting point of the resulting product is depressed at least 15% but not more than 90% of the difference between the initial melting point of the mixture and the melting point of the corresponding true interpolyamide. The initial melting point of the mixture of polyamides, as disclosed in the patent, is that determined by heating the mixture just sufficiently to form a single liquid phase. According to the patentee by controlling the time of heating and the temperature, products having the desired properties intermediate between those of the polyamide mixture above-mentioned and the true interpolyamide can be obtained. Undesirably, however, the process involves prolonged heating in the molten state, the process characteristically requiring at least one hour and on occasion two hours for the accomplishment of the said degree of lowering the melting point.

Heretofore in addition to the above-mentioned disadvantages and the disadvantages mentioned in my copending application Ser. No. 621,868, filed Mar. 9, 1967, now U.S. Pat. No. 3,480,596, the disclosure of which is incorporated herein by reference, it has not been found practicable to obtain high relative viscosity polymeric material, i.e. above an RV of about 50, of good uniform properties by autoclave polymerization.

It has now been discovered according to the invention that novel copolyamides not attendant with the above-mentioned disadvantages, and possessed of many advantageous properties, can be prepared.

OBJECTS OF THE INVENTION

Accordingly it is a primary object of this invention to provide novel copolyamides having improved properties.

It is a further object to provide novel filament forming material which permits an improved spinning process.

It is also an object to provide filamentary yarn possessing improved spun yarn processing characteristics.

It is an additional object to provide filamentary yarn having improved physical properties.

It is also an additional object to provide an improved process for forming polymeric material of increased relative viscosity.

The above and other objects which will readily become apparent hereinafter, are accomplished, in accordance with one aspect of the invention, by a synthetic linear polymeric material comprising from about 85–95% by weight of the polymeric material of polyhexamethylene adipamide having the repeating unit:

hereinafter for convenience referred to merely by ($-N_{66}-$) and from about 15–5% by weight of polycaprolactam having the repeating unit:

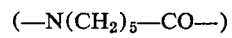

hereinafter referred to merely by ($-N_6-$).

It will, of course, be understood by those skilled in the polymer art that such polymeric material not only contains molecules of varying lengths but also molecules having different arrangements of the repeating units, e.g. some random and some block. With the instant polymeric material, for example, the interpolymer is determined to be of the general average molecular structure $(N_{66x}-N_{6y})_n$ or $(N_{66x}-N_{6y})_n-N_{66x}$, where $N_{66x}$ and $N_{6y}$ are polymer blocks and $n$ is an integer.

Thus for an interpolymer of 10% by weight polycaprolactam the average structural formula may be represented by

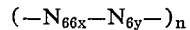

wherein $x$ is a block of from 54 to 108 units and $y$ is a block of from 6 to 12 units. When $n=1$ or 2, the average molecular weight of the above is from about 12,920 to about 25,810 as determined by conventional relative viscosity correlations.

In accordance with another aspect of the invention, and contrary to all expectations, it has been discovered that a small amount, less than about 8 percent, of a second aliphatic polyamide, such as e.g. nylon 6, interpolymerized with nylon 66 leads to improved physical properties such as tenacity, in the drawn filaments, at a given extension to break when the interpolymer is spun and drawn under conditions hereinafter described, without an undesirable decrease in melting point. Preferably the nylon 6 is present in the last mentioned inventive aspect in an amount of from about 1–6 percent by weight of the interpolyamide.

While applicant does not wish to be limited by any theoretical explanation of his invention, it appears, however, that the random molecules present in the copolymers above-mentioned may be the active component producing the desirable attributes of the invention when the polymeric material is spun and drawn under the process conditions hereinafter described.

DRAWING

Figure 2:
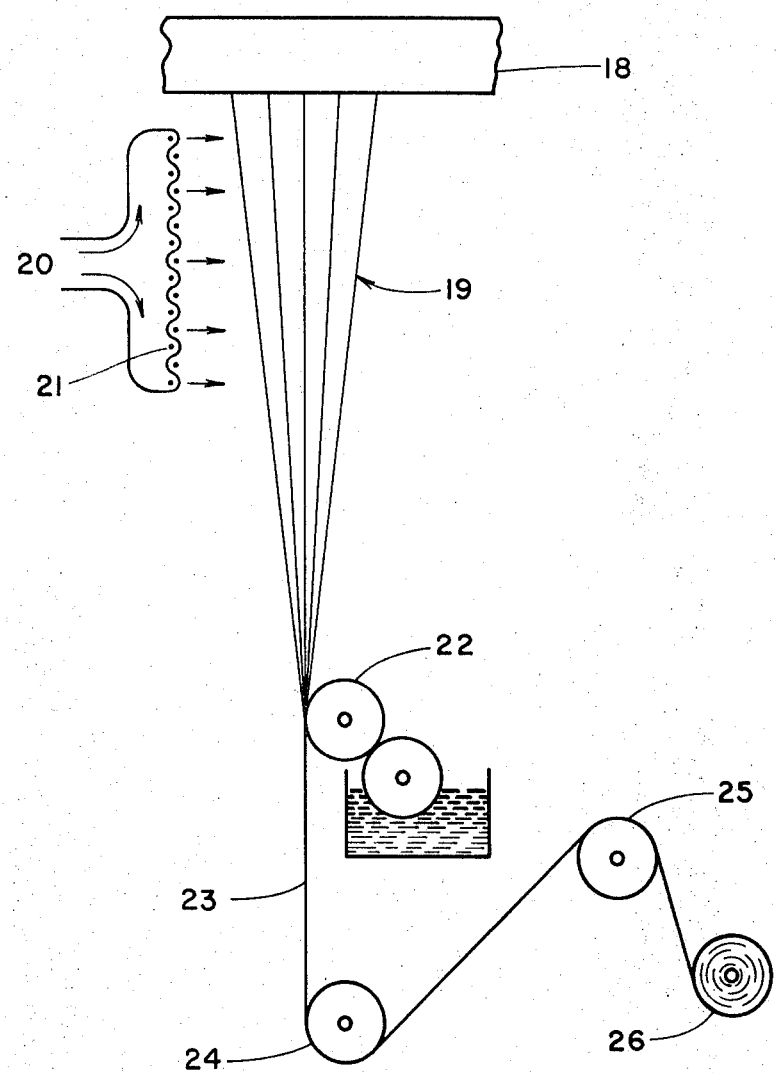
Figure 3:
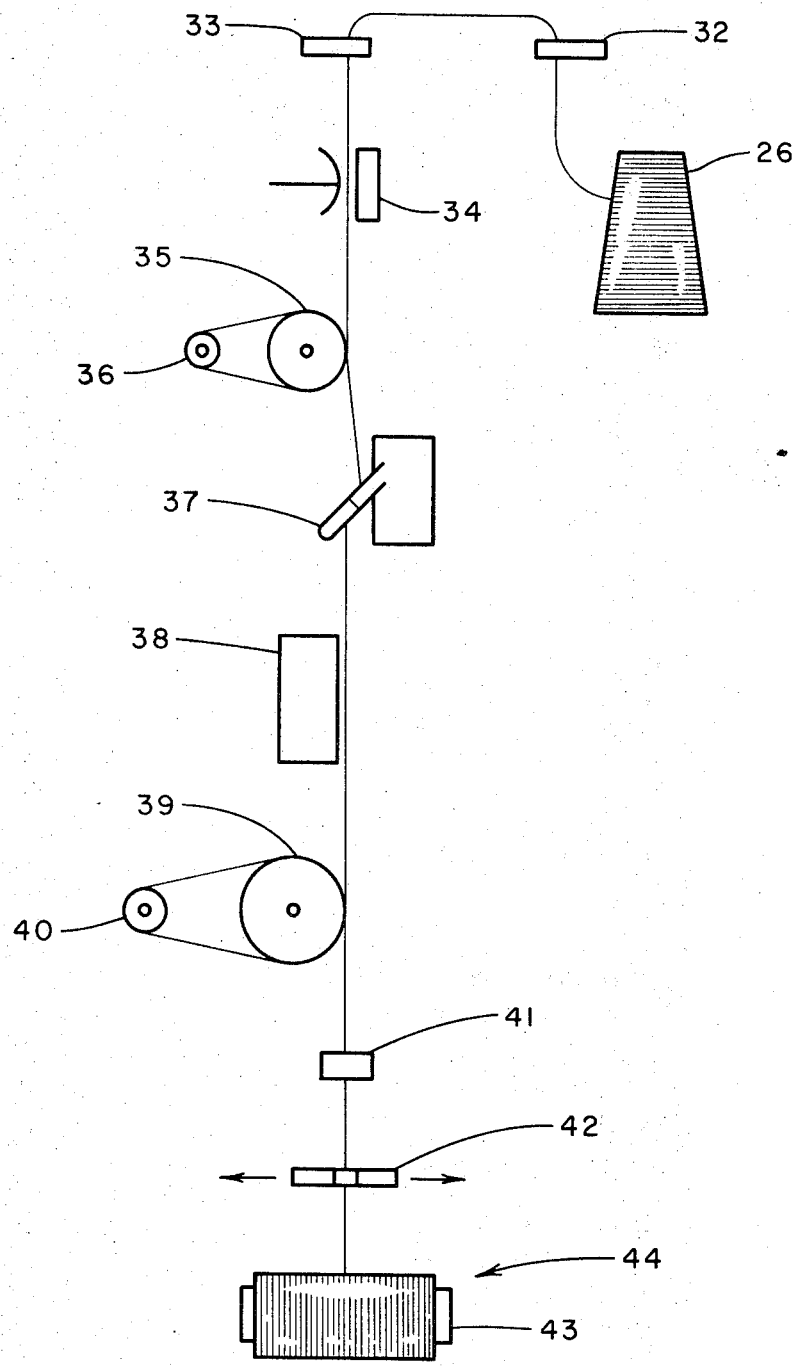

The nature of the invention will be more clearly apparent by reference to the following description when taken in connection with the accompanying drawing, in which: FIG. 1 is a diagrammatic view of one process of making a copolymer according to the invention; FIG. 2 is a diagrammatic view of the spinning of the filament forming material; and FIG. 3 is a diagrammatic view of the drawing of the filamentary material spun according to the invention.

DETAILED DESCRIPTION OF THE INVENTION

Referring now to the drawing there is disclosed in FIG. 1 thereof a diagrammatic representation of an apparatus for the practice of one aspect of the invention herein disclosed. Chips of ordinary autoclave nylon 66 and nylon 6 having any desired relative viscosity but which preferably have an RV of less than about 50, and desirably even less than 48, are mechanically mixed or blended together in chip blender 10 and then charged to feed hopper 11 for feeding into externally heated tube 12. The blend of chips is then forwarded through the heated tube wherein oxygen and water sufficient to subsequently result in the desired RV is stripped from the chips as they proceed and are discharged into melter 13. A stream of non-reactant or inert gas 14, such as for example, nitrogen, enters the melter immediately above the melt grid 15 and flows around and through the mass of chips (not shown in the drawing) deposited on the melt grid and passes up tube heater countercurrent to the flow of blended chips. The nitrogen stream 16, now partially saturated with water vapor, flows out the top of the tube 12 and discharges to the atmosphere through feed hopper 11. Melter 13, as is the rest of the system, is sealed to prevent the escape of nitrogen and ingress of air, making the hopper the only point of escape from the inert gas stream. The tube dryer serves to dry the chip blend or mixture to such a degree that at least part of the water of equilibrium of the polymeric materials is removed thereby resulting in rapid condensation and re-equilibration to a higher relative viscosity (RV) on melting. Some polymerization can, if desired, take place in the solid phase. Such, of course, depends on the temperature to which the chips are subjected, and generally in the practice of the invention is on the order equivalent to about 1–2 RV units. However, upon melting the nylon 66 and nylon 6, being in a relatively dry state and being relatively free of water re-equilibrate to a polymer having a considerably higher relative viscosity. The chip is dried in tube dryer 12 and upon entry into melter 13 until sufficient water is removed from the chips to shift the polymerization equilibrium upon melting to an interpolymer having an RV of 50 or more, and even preferably about 60 or more.

In addition to the polyamides re-equilibrating to a higher RV level the nylon 66 and nylon 6, upon melting, react to form a copolymer having a melting point only slightly less than that of nylon 66 and having on the average a very orderly arrangement of blocks of nylon 66 polymer followed by blocks of nylon 6 polymer in the same molecule. A copolymer containing e.g. 8% nylon 6 has a melting point only from about 2.5° C. to 5.0° C. less than nylon 66 homopolymer while a copolymer containing about 15% nylon 6 has a melting point only from about 3.5° C. to 5.0° C. less than nylon 66 homopolymer. The melting point of nylon 66 homopolymer is about 263° C. The melt, having resulted from melting a relatively uniform blend of chips of nylon 66 and nylon 6, and also being mixed, is a single liquid phase.

The copolymer melt 17 is then forwarded by conventional means (not shown) to a spinnerette 18 containing a plurality of holes or orifices therein, represented diagrammatically in FIG. 2 of the drawing. The plurality of filaments 19 which are extruded through the orifices are cooled and solidified in a chimney (not shown) of conventional design by a flow of cooling medium 20 e.g. air, moving transversely across the filaments as they pass down the chimney. Cooling medium 20 is caused to be uniformly distributed by means of screen 21 such being typically disclosed in U.S. Pat. 2,273,105. The filaments are collected together in the usual fashion being subsequently passed in contact with a liquid finish applicator roll 22 without being previously subjected to steam conditioning which is general practice and is disclosed in U.S. Pat. 2,289,860. The bundle of filaments 23 is then passed around feed rolls 24 and 25 and is wound onto bobbin 26 to form a package of yarn suitable for subsequent processing, such as drawing, texturing, staple formation and the like.

This aspect of the invention will now be further described with even more particularity. Although the particular blender is of no consequence with respect to the practice of the invention, it is critical, however, that a uniform blend of nylon 66/6 chips be provided and charged to hopper 11. While in the practice of the invention, a double cone rotating tumble dryer (unheated) is preferably used it is also possible to use a screw blender or other blending means. Quite desirably, a uniform chip blend can be provided to feed hopper 11 by air or nitrogen or the like fluid conveying means. For example, with respect to fluid conveying, chips of each of the polyamides are charged upstream from the feed hopper separately into a conduit through which nitrogen or the like of a desirable pressure is flowing. In passing through the conduit the chips become uniformly blended with one another by the fluid flow. In the practice of the invention, however, chips were uniformly blended, collected and stored in suitable containers for subsequent use, as desired, in charging feed hopper 11.

The blending of chips uniformly is deemed essential in order to provide a copolymer melt which uniformly contains at least 5 percent (by weight) nylon 6 polymer (based upon the weight of the copolymer), preferably from 8–12% and even more desirable 10%. Non-uniform blending of the chips results not only in a non-uniform quality interpolymer being produced but is attendant also with gelling, resulting in shortened melter and pack life and added maintenance. Below 5% nylon 6 in the interpolymer gelling occurs as shown by off-luster indications very similar to that with conventional nylon 66 homopolymers. Above 15% there is no appreciable strength improvement in the yarn. Uniform blending, of course, depends to some degree not only on the type blender used but also on the relative size and shape of the polymer chips. Quite desirably the size and shape of the two polyamide chips are compatible to obtain precise blending thereby avoiding a melt copolymer of varying concentrations, hence yarn of varying physical properties, deterioration of spinning luster and increased melt pool gel build-up.

As heretofore mentioned, the blended polyamide chips are charged to feed hopper 11 which is open-topped and contains a valve (not shown) in the bottom thereof for preventing undesirable flow of blended chips into tube heater 12. Such valve can be a simple slide valve since it is merely an off-on control. Feed hopper 11 can be of any design desired keeping only in mind to provide for the escape of the nitrogen purge gas and for the uninhibited flow of chips into the tube dryer. Chips should not be allowed to bridge across the inlet or the outlet of tube 12, as hereinafter further disclosed. While a shorter or longer tube can be used, as well as a tube of greater or lesser diameter, so long as adequate residence time is provided to obtain the desired degree of drying for the subsequent desired increase in relative viscosity at the particular feed rate, a tube 16 feet long having an inside diameter (I.D.) of 3¼ inches is found quite suitable. By way of example, at a chip blend throughput of 69.3 lb./hr. in the above tube, a residence time of 27 minutes is provided which with temperature conditions that are practical and with electrical strip heating is sufficient to result in a copolymer having an RV of about 59. Tube heater temperatures over 230° C. should be avoided as such will cause the nylon 6 chip to soften thereby tending to permit the chips in the blend to bond together. Lower temperatures i.e., below 100° C., however, limit the increase which can be obtained in relative viscosity. Preferably the tube heater should be at a temperature of from about 130° C. to about 210° C., and even more desirably from about 150° C. to about 180° C. It is deemed understood by those skilled in the art, however, that heater temperature may depend to some extent on the design of the heater as well as the particular heating medium. Desirably, however, uniform heating of the chips is obtained. Tube diameter and length must, however, be coordinated together with heating of the tube to prevent an excessive temperature gradient between chips at the center of the tube and those along the inside wall. It will of course be obvious to those skilled in the art that optimum tube diameter and length to obtain uniform heating without an excessive temperature gradient, desired residence time and plug flow will depend on a number of factors. Among these are chip size and shape which of course affects the diameter at which plug flow ceases, and the heating medium used. By way of illustration steam heating has been determined to be much more uniform and efficient than the above-mentioned electrical strip heaters. In contrast the interpolymer RV above-mentioned was obtained on a tube only 10½ feet long, 3½ inch diameter heated by steam. The chip temperature was determined to be 155° C.

Tube 12 as can be seen in FIG. 1 of the drawing is surrounded by jacket 27 which is divided into three separate zones 28, 29 and 30 wherein steam as shown by the arrows, is admitted for the heating of the tube which, of course, in turn heats the blend of polyamide chips. While other heating mediums can be used, e.g. Dowtherm (a mixture of diphenyl-diphenyl oxide) or the like, it should be pointed out that steam heating is found quite suitable and provides, as above-mentioned, more uniform heating across the tube surface than the electrical strip heaters disclosed in copending application Ser. No. 621,868 filed Mar. 9, 1967, above-mentioned, and entitled Process of Forming Polymeric Material of Increased Relative Viscosity. If desired, of course, the jacket need nat be divided into separate zones, such merely adding some degree of flexibility for some purposes. Heat input to the tube heater 12 is controlled by conventional means depending on one or more thermocouples (not shown) desirably positioned within the tube heater for indication of chip blend temperature. It is believed understood by those skilled in the art of heating and polymerization, however, that control can be based on heater temperature in contrast to chip temperature to give the same desired product.

Between tube dryer 12 and melter 13 the flow of chips must not be inhibited. Bridging of chips at this point, even intermittently, results in undesirable increased residence time in the dryer which in turn results is undesirable increased relative viscosity and/or varying viscosity, and raises the melt viscosity to a level at which pumping may become difficult.

Melter 13 is of conventional design such as is disclosed in U.S. Pat. 3,010,147, the disclosure of which is herein incorporated by reference, having a melt grid 15 located therein, a screw (not shown in the drawing) for feeding the chips into the melter and forcing them against the grid, and a melt pool indicated by reference numeral 31 in the bottom thereof. Located in the bottom of the melt pool is a booster pump for pumping molten polymer to an extrusion meter pump and spinnerette. The melter, which forms no part of the invention herein, is shown in greater detail in my copending application above-mentioned, the disclosure of which is herein incorporated in toto by reference. The melter, as is usual, is jacketed, at least below the grid thereof in the melt pool area, for heating by Dowtherm or other heating fluid. The grid is also heated by Dowtherm. Because of thermal degradation and/or gel formation resulting in spinning and yarn property deterioration the lowest practical melter temperature is used. Such temperature is preferably in the range of from about 280° C. to about 305° C., desirably from about 280° C. to about 291° C. Higher temperatures result in reduced melter life and poor yarn physical properties, lower temperatures cause unmanageable high melt viscosity.

Nitrogen, which may or may not be heated, as desired, is passed into melter 13 through a circular manifold (not shown) but which is located above melt grid 15. The amount of nitrogen must be sufficient to carry away the water caused to diffuse to the chip surfaces as a result of the heating in tube heater 12 and melter 13. Such will, of course vary, determined to some degree by the variations in chip moisture of the chips entering the tube, as well as the amount of polymerization to be conducted in the tube and in the melter. Merely by way of example a nitrogen flow of from about 6 s.c.f.m. to about 20 s.c.f.m. is suitable to obtain the desired RV increase. While an excess nitrogen flow has no significant effect on further RV increase, an insufficient amount of nitrogen results in a copolymer having less than the desired relative viscosity. Moreover, the nitrogen flow rate must exceed the minimum required to stay above its dew point in the hopper.

Nitrogen, which is at room temperature in hopper 11 is partially saturated with wather vapor and as shown in the drawing is discharged to the atmosphere. If desired, however, the nitrogen stream can be recirculated in the system after removal of oxygen and drying thereof in known manner. Heating the nitrogen may be desirable if it is also desired to solid-phase polymerize in the tube dryer or avoid any cooling of chips on the grid.

By way of further illustration of this aspect of the invention such will now be described in the following example wherein reference to parts or percentages therein is intended to be by weight unless otherwise indicated.

EXAMPLE I

Nylon 66 chips (280 lbs.) conventionally produced in an autoclave, such as is shown, for example, in U.S. Pat. 2,289,774, and having a relative viscosity (RV) of 48, as measured in formic acid by usual techniques, and a water content of about 0.8% by weight of chip were blended in an unheated double cone dryer with chips of nylon 6 (31 lbs.). The nylon 6 chips had an RV of 57 (measured in 8.4% w./w. 90% aqueous formic acid), a moisture conten less than about 0.5% and a monomer content of less than 1.0%. The nylon 66 chip had an irregular shape and all chips passed through a ⅜ inch screen. The nylon 6 chip had the conventional spaghetti shape of a cylinder having a diameter of ⅛ inch and a height of ⅛ inch, and 100% of the chip passed through a screen of 3/16 inch mesh.

The chip blend was charged to feed hopper 11 from which it was forwarded to a tube heater at 69.3 lbs./hr. The tube heater was 16 feet long and had an inside diameter of 3¼ inches. It was heated by electrical strip heaters, such as are described in my above-mentioned copending application. The chip blend was controlled at a temperature of 175° C., such temperature being measured by a thermocouple located 4 feet from the bottom of the tube and ½ inch from the inside wall surface, and was dried and purged of water vapor by a countercurrent flow of nitrogen (10½ s.c.f.m.) introduced into the melter through a circular manifold located above the melt grid. The blend of chips was charged into the melter by means of a screw feeder and were deposited under pressure onto the melt grid such being heated by Dowtherm having a temperature of about 285° C. The screw feeder maintained a constant chip feed of 69.3 lbs./hr. to the melter and served to force the chips against the melt grid openings which are about ⅛ inch in size.

Upon melting, both polyamides being relatively dry reequilibrated rapidly to a higher polymerization equilibrium while simultaneously reacting with one another to form a copolyamide. The water formed in the condensation reactions remained in and was dissolved in the interpolymer melt thus serving to determine the final relative viscosity.

The molten blend having a melt viscosity of approximately 2,000 poises, dropped through the interstices of the melt grid and passed through a semi-circular downpipe of about 1½″ x ¾″ into the bottom part of melter 13 thus forming a melt pool as disclosed in my previously mentioned copending application. Because of the size of the interstices in the grid and the smallness of the downpipe such are always filled with molten copolymer during operation thus preventing water of condensation from passing up through the chips on melt grid 13. Moreover, a further seal is provided because the bottom of the downpipe is below the melt pool surface. A nitrogen blanket was maintained over the melt pool as indicated in the drawing. The two polyamides, upon melting, react with one another by transamidation or amide interchange to form a copolymer having a melting point of 259.5° C. and an RV of 59 in which the blocks of each polyamide component are of greater average length than those of completely random copolymers of the same percentage composition, although a small amount of random copolymer is present.

The melt, being only a physical mixture at the time of melting, was heated and agitated in the melt pool under a nitrogen blanket to obtain a homogeneous melt blend and to allow time for RV increase and copolymerization simultaneously. The melt blend temperature should be above 263° C., preferably about 275–270° C. The time during which the melt blend is held in the melt pool is desirably kept to a minimum, the reaction to the desired copolymer being complete in less than about 5 minutes, so that there will be minimum amide interchange between the nylon 6 and nylon 66, thereby maintaining optimum block length. Although the reaction between the polyamides commences with melting and continues as long as the copolymer is molten, even up to the point of solidification after the extrusion into filaments thereof, several hours are required for transformation of all the polymeric material into a completely random copolymer.

If a copolymer having molecules of lesser block length is desired i.e., a copolymer wherein the interpolymer molecules have the nylon 66 and nylon 6 units in a more random arrangement, one need merely increase the melt pool residence time.

EXAMPLE II

The process in Example I was repeated except that a jacketed tube heater 12, as shown in FIG. 1 of the drawing, having three sections of about 5' in length, 3½" diameter joined end-to-end was used. The tube was heated by 180° C. steam only in the lower two sections. While the chip temperature, measured by a thermocouple located about 10" from the tube discharge, was only 150° C., an interploymer of the same RV as in Example I was obtained on melting.

The following example illustrates a further aspect of the invention.

EXAMPLE III

A random interpolyamide consisting of 97 parts by weight of nylon 66 and 3 parts by weight of nylon 6 and having a relative viscosity of 44.6 was prepared in an autoclave by the copolymerization of hexamethylene diammonium adipate and caprolactam under conditions conventionally employed for the manufacture of nylon 66.

The relative viscosity of the interpolyamide was raised to 59.8 by extruding the polymer as molten filaments into an inert atmosphere to remove water and then maintaining the polymer in the liquid state for about 6–7 minutes to allow for the polymerization to take place, in the manner described in British patent specification 1,042,229.

One of the most surprising, as well as the most significant aspects of the invention consists in the discovery, as hereinafter more fully described, that the novel copolymers though containing a relatively small amount of nylon 6 can not be spun or otherwise processed under conventional nylon 66 conditions. Moreover, at high RV's spinning and processing of nylon 66 homopolymer filamentary yarns are not practicable under the novel process conditions hereinafter more fully disclosed. Quite unexpectedly it has been discovered that to develop full yarn strength the yarn must be spun under low spun moisture application without the conventional steam conditioning and must be lagged or conditioned for at least 12 hours before drawing. Quite advantageously, however, it has also been discovered that cakes of interpolymer yarn according to the invention do not suffer from "ageing" effects to the same extent as cakes of nylon 66 homopolymer yarn. The manner of spinning and processing of the novel interpolymers will now be described in much greater detail.

Molten copolyamide was pumped from the melt pool by means of conventional booster and metering gear pumps according to usual techniques, into a filter pack. The copolymer was forced through a spinnerette shown diagrammatically in FIG. 2 by reference numeral 18 of about 3¾ inches diameter having 140 orifices therein, arranged in a crossed diagonal pattern i.e. diamond shaped, of 0.30 inch diameter. The filaments after issuing from the spinnerette were cooled and solidified in the chimney (not shown) by air 20 traveling at right angles to the direction of filament travel at about a rate of 67 s.c.f.m. The filaments after passing from the cooling chimney were passed through the atmosphere for a distance of about 10 feet without being steam conditioned. A commercially available finish was applied to the yarn or filament bundle from a water emulsion, the concentration of which was sufficient to apply only about 1.5% $H_2O$ to the filaments by means of roll 22. After traveling a distance of about 20 inches downwardly from the finish applicating roll, the yarn was passed about positively driven feed rolls 24, 25, positioned about 10 inches apart, and was then fed to a bobbin 26, positioned about 30 inches from the second feed roll and there wound into a yarn package. The yarn was wound on the package at a rate of about 960 feet per minute, and the pump rate was so adjusted that the denier of the yarn was approximately 4300. The peripheral speed of the feed rolls was set so as to provide ¼% stretch between each pair of rolls. Under these conditions a bobbin containing about 21 pounds of yarn was obtained of satisfactory package formation. The yarn could not, however, be drawn immediately. It was necessary to condition the yarn for at least 12 hours at 65% relative humidity (72° F.), before it was ready for drawing. No deterioration of drawing quality was found to occur even after 37 days' storage.

Surprisingly, and unlike yarn of nylon 66 homopolymer, yarn from the copolymer of the instant invention does not increase in strength indefinitely with increased quench air flow. As shown in the table below, best yarn properties are obtained at 67 s.c.f.m. quench air. Tenacity falls off as quench air is increased to 80 s.c.f.m. and filament stability is relatively poor compared to that at 67 s.c.f.m. Thus maximum tenacity occurs at the quench flow giving the best filament stability. Flow rates lower than about 50 s.c.f.m. inadequate quench resulting in filaments sticking together at the convergence guide.

YARN PROPERTIES

| | Draw ratio | Quench air (s.c.f.m./end) | | | | | | | | |
|---|---|---|---|---|---|---|---|---|---|---|
| | | 52 | | | 67 | | | 80 | | |
| | | Tenacity (g.p.d.) | Elongation (percent) | Modulus (g.p.d.) | Tenacity (g.p.d.) | Elongation (percent) | Modulus (g.p.d.) | Tenacity (g.p.d.) | Elongation (percent) | Modulus (g.p.d.) |
| Finish roll 20 r.p.m. | 5.04 | | | | 9.24 | 14.0 | 60.4 | 8.98 | 13.6 | 58.9 |
| | 5.09 | 8.98 | 14.5 | 56.4 | 9.41 | 13.8 | 64.5 | 9.20 | 13.8 | 61.2 |
| | 5.20 | 9.10 | 13.3 | 58.4 | 9.55 | 13.3 | 66.0 | 9.30 | 12.8 | 59.3 |
| Draw heater 197° C. | 5.26 | 9.38 | 13.0 | 57.2 | 9.62 | 12.9 | 59.5 | | | |
| | 5.32 | 9.39 | 12.5 | 58.7 | 9.66 | 13.3 | 68.6 | | | |
| | 5.36 | 9.56 | 12.0 | 58.3 | | | | | | |

Contrary to the spinning of continuous filament yarn of nylon 66 polymer unmodified with nylon 6, the steam conditioning disclosed in U.S. Pat. 2,289,860, of filaments of this invention is found unnecessary, and quite unexpectedly even undesirable in that yarn strength is reduced by steam conditioning and package winding is more difficult rather than being improved. It has been discovered in the practice of the invention that conditioner steam must be turned off to eliminate non-uniform filament growth and to obtain full yarn strength. Steam conditioning, as disclosed in the prior art, and heretofore thought essential, of the filamentary material, causes the filaments to absorb moisture and to grow in length before reaching the windup bobbin, and this prevents them from picking up moisture and growing in length after being wound up. Humidity control and air conditioning in the spinning room are not required when yarns are steam conditioned, such being disclosed in the above-mentioned U.S. Pat. 2,289,860. While steam conditioning has been disclosed in at least one patent, namely, U.S. Pat. 2,039,171 to result in yarns of greater tenacity than those not steam conditioned, such treatment is, however, accomplished with certain disadvantages. Among these is the fact, as disclosed in U.S. Pat. 2,982,994, that steam contact should remain constant if a uniform yarn is to be achieved. As an alternative to steam conditioning the spinning of polyamides into a low humidity environment e.g., a relative humidity of less than 50% and conditioning them in a similar environment has been suggested by others in the art, e.g., U.S. Pats. 2,811,410 and 2,918,347. The attainment of such a low humidity environment is quite costly, if at all possible in any particular existing manufacturing operation.

In the spinning of artificial filaments, yarns, ribbons, and the like from melts of organic filament-forming compositions, the filaments, as disclosed in U.S. Pat. 2,289,860, above-mentioned, issue from the spinnerette substantially free from absorbed moisture. Many of such organic filament-forming compositions, for example, synthetic linear polyamides, after being spun, absorb moisture from the air and as a result increase in length. Even if the dry yarn is wound on a support, such as a bobbin, under considerable tension, the increase in the length of the yarn causes it to slip or slough off the bobbin. The wound yarn package or cake is consequently distorted and assumes a bumpy, blistered or wrinkled appearance. This results in inequalities in the yarn since the yarn in various portions of the package may be free to elongate to different extents. The package formation is unsatisfactory both from the point of view of spinning operation and delivery of the thread of subsequent processes, e.g., drawing. At sufficiently low spinning speeds, the filaments may pick up moisture either from the air or from liquid water applied to them in the form of a finish, or otherwise, and the greater part of the increase in length of the thread accompanying moisture absorption is brought about before the yarn is wound up under tension. At higher spinning speeds, moisture applied by these means is not absorbed quickly enough, i.e. before it is wound on the bobbin, and poor package formation is the result. The use of the steam between the spinnerette and the wind-up makes it possible for the yarn to absorb moisture and increase in length before it is wound up under tension on the bobbin. As before mentioned, steam treatment of yarn or spinning into low humidity atmosphere heretofore has been deemed essential in order to spin fibers from melts at a relatively high rate and to obtain well-built packages on bobbins which will not loosen undesirably on the wound package, upon subsequent exposure to the atmosphere.

Also quite surprisingly it has been determined that yarn according to the invention must, in addition to being spun without steam conditioning, necessarily have a low application of moisture thereon from the finish roll for optimum strength and to retard yarn growth sufficiently for building good spun cakes, although package winding is improved by higher moisture application at this point. This in itself, while not totally understood, is contrary to the effect of moisture added by steam conditioning. The effects of steam conditioning and moisture application by the finish roll on the yarn of Example I are shown in Table I below.

The nylon 66 polymer used as a control (Experiment I in Table I) was polymerized, spun and drawn according to usual techniques.

In a similar manner the effects of steam conditioning and moisture application by the finish roll on the yarn of Example III interpolymer (840/140) are shown in Table II below. The RV of nylon 66 homopolymer control in Experiment 3 was increased in the manner described in British patent specification 1,042,229, above-mentioned.

TABLE I

| | RV | Yarn type [polymer(s)] | Steam conditioning | Moisture applied with finish | Package properties | Yarn tenacity g./den. (drawn to 13.3% elongation) | Drawing performance |
|---|---|---|---|---|---|---|---|
| Experiment: | | | | | | | |
| 1 | 48.3 | Nylon 66 | Yes | Normal * | Stable (no growth) | 8.6 | Normal. |
| 2 | 48.3 | do | No | Low (1.5%) | ** | 8.9 | Very poor. |
| 3 | 59 | Nylon 66/6 | Yes (same as N-66) | Normal | Grows *** | 8.9 | Do. |
| 4 | 59 | do | Reduced **** | Low-normal | Grows less than 3 | 8.9 | Poor. |
| 5 | 59 | do | No | Normal | Satisfactory growth | 8.8 | Normal. |
| 6 | 59 | do | No | Low | do | 9.3 | Do. |

\* Necessary to prevent growth on package and to provide yarn having good drawing properties, about 5% water applied including that from steam conditioning, steam conditioner orifice 0.055", steam pressure 6 p.s.i.g.
\*\* Grows relatively small amount during winding but considerably while on package.
\*\*\* Growth is such as to cause winding problems.
\*\*\*\* Moisture applied is more than 1.5% but less than 5% due to fact steam conditioner orifice changed to 0.043" and steam pressure 2 p.s.i.g.

In the manufacture of filament yarns from synthetic linear polymers such as the polyamides, polyesters and the like, it is known that ultimate yarn tenacity can be greatly increased by employing the technique of drawing, which comprises stretching the yarn filaments after their formation to increase molecular orientation.

TABLE II

| | Polymer | RV | Steam conditioner | Spun yarn moisture content, percent | Lagged* | Tenacity g./d. | Extension at break** percent |
|---|---|---|---|---|---|---|---|
| Experiment: | | | | | | | |
| 1 | 66/6 interpolymer | 59.8 | No | 1½ | Yes | 9.0 | 16.1 |
| 2 | do | 59.8 | Yes | 3½–4 | No | 8.2 | 15.4 |
| 3 | 66 homopolymer | 64.3 | Yes | 3½–4 | No | 8.8 | 13.9 |

\* Lagged 24 hours.
\*\* Draw ratio 5.33, hot plate 187° C.

Although the drawing operation can be conducted by various means, a common procedure is to employ two filament advancing devices generally known as a feed roll and draw roll. Filament stretching is achieved by running these rolls at differential speeds with the amount of stretching or drawing being determined by the ratio of the peripheral speeds of the two rolls. In order to localize the point at which stretching occurs, a braking device is sometimes placed between the feed roll and draw roll. Generally, the braking device consists of a pin, called the "draw pin" around which the yarn is wrapped a number of times. The draw pin introduces frictional drag on the moving filaments which causes stretching to take place in the area of the draw pin. The introduction of frictional drag to localize stretching is utilized in those instances where there is a tendency for non-uniform drawing to occur since greater uniformity can be obtained by employing this procedure.

It is known that the drawing operation can sometimes be facilitated when the yarn temperature is elevated during drawing. The heating may be carried out by inserting a hot pin, a hot plate, or hot fluid bath between the feed roll and draw rolls of the drawing apparatus or by using a heated feed roll. Elevated temperatures are effective because intermolecular forces are diminished by the resulting increase in molecular activity, and therefore the ratio of the force required to draw the yarn to that required to break it is lessened. Permissible temperatures which may be used in hot drawing vary somewhat with the nature of the polymer from which yarn is formed, since the maximum temperature which can be employed is limited by the polymer melting point. It is a common practice to employ a hot drawing technique when processing yarn for use in products which require great tensile strength, as for example in the manufacture of reinforcement cords for inflatable tires.

Yarn according to the invention, and as described in the above examples, was subjected to a pinplate stretching or drawing operation shown diagrammatically in FIG. 3 of the drawing, to align and arrange the crystalline structure of the molecules in order to achieve maximum tensile properties in the yarn.

The source of yarn in the drawing operation may be either bobbin 26 or the solidified extruded mass of filaments 19, hereinafter more fully described. Yarn was led from bobbin 26 through guides 32, 33 into a tensioning device 34 and onto feed roller 35 and separator roller 36. Thereafter it passes over the non-rotatable snubbing pin 37 (cold) and heated plate 38 (187–197° C.). The drawing operation occurs as the yarn is removed from the snubbing in due to the stretching action of drawing roller 39 which was operated at a higher speed than feed roller 35. Merely by way of example the draw roll may operate at 830 f.p.m. and the feed roll at 167 f.p.m., resulting in a draw ratio of 4.97. From the drawing roll the yarn then passed over separating roller 40 through guide 41 and was fed by means of the traversing guide 42 upon the wind-up bobbin 43 to form a package of yarn 44. The nylon 66/6 yarn of this invention was found to yield higher tenacities than homopolymer nylon 66 when fully drawn, on the order of 9.0–10 g.p.d., and higher. Physical properties on yarn of the instant invention were determined on an Instron tensile tester according to conventional techniques well known to those in the man-made fiber art.

Quite unexpectedly and contrary to nylon 66 polymer yarn, it was discovered that the physical properties and drawing performance of yarn according to the invention do not deteriorate even after as much as 37 days of storage at a relative humidity of 65% (72° F.). By contrast nylon 66 yarn, if stored under similar conditions for a period longer than about 72 hours loses moisture to the atmosphere and is therefore insufficiently plasticized for satisfactory drawing. As is well known more water is put on nylon 66 yarn during steam-conditioning and finish application than is required for satisfactory drawing to account for the fact that water is evaporated from such yarn during storage thereof. Yarn, according to the invention can, however, even after spinning under low moisture conditions, as hereinbefore described, be quite satisfactorily drawn after a lag time of about 12 hours. During this lag time the yarn absorbs moisture from the atmosphere which plasticizes it satisfactorily for drawing. As shown in Table I above, nylon 66 yarn without steam conditioning and with low moisture application by the finish roll performed very poorly in drawing i.e. the drawing operation involved excessive breaks and/or filamentation. In the same table it is seen that drawing of yarn of the instant invention was poor, i.e. unacceptable and of little improved tenacity unless spun according to the invention.

The efficiency of the draw twist operation, according to the invention, is believed further indicated by the data tabulated below in which yarn spun from the nylon 66/6 interpolymer according to Example II is compared with yarn from conventional nylon 66 homopolymer.

DRAW TWIST FAULTS

| Polymeric material | Breaks per 100 lbs. | Filament wraps per 100 lbs. | Start-up breaks, percent | Spindle efficiency, percent |
|---|---|---|---|---|
| Nylon 66 | 2.2 | 5.4 | 13.6 | 79.2 |
| Nylon 66/6 | 0.5 | 3.4 | 5.3 | 95.0 |

It is of course entirely possible, as hereinbefore suggested, to draw the copolyamide yarn of this invention immediately after spinning in a spin-draw process, that is a process in which the polymeric material is extruded into filaments and the filaments are immediately attenuated and oriented. In the spinning and drawing process heretofore described there is a "lag-time" of at least 12 hours throughout which the as-spun filaments are stored under uniform conditions of temperature and humidity. During lagging, the filaments undergo a number of physical and other changes. Thus the filaments absorb moisture from the finish and/or from the atmosphere, crystallize further, undergo a small change in length and increase their birefrigence. Additionally the finish applied to the filaments during spinning tends to become more evenly distributed as excess surface moisture is allowed to evaporate. Quite surprisingly, it was discovered that if the filamentary yarn herein disclosed was drawn in a continuous spin-draw process, within about two minutes after extrusion, a a draw ratio of from about 4.0 to 5.5, preferably 5.0, a yarn having relatively good physical properties was obtained. If, however, more than about two minutes elapses after extrusion, the yarn must be lagged to provide for efficient drawing thereof. Apparently, and I do not wish to be held to this theory, in view of the fact that the yarn is not subjected to steam conditioning the amount of crystallization is reduced, and any crystallization that has occurred within the two minute time period does not adversely affect drawing in the spin-draw process.

The instant filamentary material has advantageous utility, when spun from high RV polymer, in tire cords and is characterized in that form after hot-stretching under optimum conditions, i.e., those conditions which produce cords of tenacity and least growth at acceptable levels of break elongation and resistance to fatigue. It is well known that cord growth in polyamide tire cord, which some workers in the art suggest correlates with the "flat-spotting" tendencies of completed tires, i.e., less cord growth results in reduced flat-spotting, can be reduced by hot stretching. However, it is equally well known that the properties of cord elongation and resistance to in-rubber fatigue are also diminished during the same hot-stretching operation. Accordingly, the conditions of hot-stretching are carefully comprised on the basis of a balance among cord properties, rather than to achieve the ultimate improvement in any one property. With polyamide tire cords, the permissible extent of hot-stretching depends on and is limited by the fine structure of the individual filaments in the yarn bundles which make up the cord. Desirably, the component filaments exhibit high tenacity and good lengthwise structural uniformity which, of course, depends on such factors as polymer quality, spinning conditions, drawing conditions, and the like.

Since the operation dealing with cord preparation from filaments, cord diping, and hot stretching are routine, the observed improvements in cord properties are a direct and useful measure of filament properties and are, therefore, employed herein for that purpose.

Cords were prepared from yarn (Example I) produced and drawn as hereinbefore described having after drawing a denier of about 840, 140 filaments, in conventional manner by first twisting the single yarn 12 turns per inch (t.p.i.) in the Z direction, and combining the single yarns in pairs at 12 t.p.i. twist to form 1850 denier two-ply cord. The Greige cords were treated with a standard resorcinol-formaldehyde-latex adhesive dip prior to hot-stretching in conventional manner to optimum properties in a Litzler oven. The severity of hot-stretching conditions employed with each yarn depends upon the properties of that yarn, providing, therefore, a highly useful measure of yarn quality and utility.

Yarns and cords representing various stages of draw and draw ratios were evaluated and the results are tabulated below.

|  | Nylon 66/Nylon 6 | | | | Nylon 66 |
| --- | --- | --- | --- | --- | --- |
| Draw ratio | 4.86 | 4.97 | 5.09 | 5.32 | 5.43 |
| Greige yarn: | | | | | |
| Denier | 868 | 856 | 829 | 797 | 844 |
| Breaking strength (lb.) | 16.5 | 16.6 | 16.8 | 17.1 | 16.1 |
| Tenacity (g.p.d.) | 8.63 | 8.78 | 9.21 | 9.74 | 8.66 |
| Elongation (percent) | 15.6 | 15.2 | 14.3 | 12.8 | 14.5 |
| Greige cord: | | | | | |
| Denier | 1,932 | 1,898 | 1,828 | 1,765 | 1,856 |
| Breaking strength (lb.) | 30.3 | 30.6 | 31.1 | 31.6 | 29.2 |
| Tenacity (g.p.d.) | 7.11 | 7.31 | 7.71 | 8.13 | 7.15 |
| Elongation (percent) | 23.2 | 24.2 | 21.2 | 19.9 | 19.8 |
| Rotoflex fatigue (hrs.) | 42 | 42 | 40 | 39 | 16 |
| Processed cord: | | | | | |
| Breaking strength (lb.) | 30.6 | 31.5 | 30.4 | 30.6 | 29.3 |
| Tenacity (g.p.d.) (based on greige cord denier) | 7.18 | 7.52 | 7.54 | 7.86 | 7.16 |
| Elongation (percent) | 19.4 | 19.2 | 16.2 | 14.8 | 15.4 |
| Change in breaking strength: | | | | | |
| Lb | +.3 | +.9 | −.7 | −1.0 | +.1 |
| Percent | 101.0 | 102.9 | 97.8 | 96.7 | 100.1 |

It is seen from the data that the least highly drawn yarn of the invention, i.e., draw ratio 4.97, has slightly lower strength properties in greige form, but contrary to the most highly drawn yarn gained strength during the hot cord stretching process. Moreover, the strength gain at a draw ratio of 4.97 is seen to be greater than at a lower draw ratio, and the yarn according to the invention has considerably greater processed cord strength gain than the nylon 66 control yarn. Furthermore, yarn according to the invention is seen to yield considerably higher tenacities when fully drawn, i.e., at a draw ratio of 5.32, yarn tenacity is 9.74 grams per denier. This uniquely stronger greige yarn is of considerable value in industrial applications where hot cord stretching is not a factor. Quite advantageously, as shown by the date, yarn according to the invention has a rotoflex fatigue more than double that of the conventional nylon 66 control yarn. The rotoflex fatigue test was performed according to techniques well known in the tire art on a B. F. Goodrich Rotoflex Tester, Model 700 manufactured by Ferry Machine Company, Kent, Ohio.

The interpolyamide filaments of this invention are not only useful in the production of tire cord of exceptional strength, but they are also useful as seat belts, tapes, parachute harness, ropes, reinforcements for fire hoses, belts, mechanical rubber products and as industrial yarns in general, as well as in textile yarns. Such yarns, in the form of filaments, tow or staple, find utility also in carpets, pile fabrics, twills, taffeta, and woven and knitted goods generally.

While the invention has been above-described with more particularly to interpolymers of hexamethylene adipamide and caprolactam it obviously is not so limited. It is possible of course to form interpolymers according to the invention from a composition of any two or more polymer forming components or linear condensation polymers, particularly the various polyamides and/or polyamide forming components disclosed in the aforementioned patents. The process need not be performed batchwise or semi-continuously as above-described. Obviously the random copolymer of Example III can be formed in a continuous process such as is described e.g. in U.S. Pats. 2,361,717 and 3,258,313. Rather than introducing chips of the two polyamides, as in Example I, into a melter-extruder, two molten polymer streams can be introduced continuously into an extruder or the like, in which they are intermixed, reacted, and extruded. Although the process is particularly useful in the formation of interpolymers of relatively high relative viscosity, it also finds utility in producing uniform polymeric material of lower relative viscosities e.g. less than 50 RV. Such process permits polymerizing to lower relative viscosity in the autoclave thereby tending to increase the productivity thereof. Any RV desired can be obtained in the tube dryer and melter, limited only by the dryer and melter capacity. In the spinning of polymeric material under low moisture conditions and without steam conditioning it is of course applicable to other polymeric materials, notwithstanding the fact that only interpolymers of nylon 66/6 are described above. Other lactams, as can other polymers or the like, may be substituted for the caprolactam, the main consideration being that a material be provided which has satisfactory moisture regain properties from the conditioning atmosphere so as to plasticize the yarn suitably for drawing.

As many different embodiments will readily occur to those skilled in polymer chemistry and the man-made fiber art, it to be understood that the specific embodiments of the invention as presented herein are not to be construed as limiting, but that the limitations are to be determined only from the appended claims.

What is claimed is:

1. A polyamide fiber-forming material comprising a copolymer of a first polyamide-forming component and about 1% to 15% of a second polyamide-forming component wherein said first polyamide-forming component is the reaction product of an aliphatic diamine and an aliphatic dicarboxylic acid or amide-forming derivative thereof, and said second polyamide-forming component is the polymerization product of a self-condensable aliphatic amino acid or amide-forming derivative thereof, said copolymer having a relative viscosity of at least about 50.

2. Polymeric material according to claim 1 wherein the first component is the reaction product of hexamethylene diamine and adipic acid.

3. Polymeric material according to claim 1 wherein the second component is the polymerization product of caprolactam.

4. Polymeric material according to claim 3 wherein the polymerization product of caprolactam is in an amount of from about 1% to about 8% by weight of the copolymer.

5. Polymeric material according to claim 3 wherein the polymerization product of caprolactam comprises from about 5% to about 15% by weight of the copolymer.

6. Polymeric material according to claim 3 which is a block copolymer wherein the polycaprolactam blocks comprise on the average from about 6–12 units of polycaprolactam.

7. Polymeric material according to claim 1 wherein the melting point is only from about 2.5° C. to about 5° C. lower than the melting point of the homopolymer of the diamine and dicarboxylic acid.

8. Polymeric material according to claim 1 wherein the copolymer is a block copolymer.

9. Yarn comprising a plurality of filaments of the polymeric material of claim 1.

10. Yarn comprising a plurality of filaments of the polymeric material of claim 1, said yarn having a tenacity of at least about 9.0 g./den. and an elongation of at least about 13%.

11. Industrial reinforcing cord comprising a plurality of filaments of an interpolymer according to claim 1, said cord having a rotoflex fatigue of at least about 35 hours.

12. Industrial cord according to claim 1 having a breaking strength of at least about 30 lbs. and an elongation of at least 19%.

References Cited
UNITED STATES PATENTS

| | | | |
|---|---|---|---|
| 3,376,270 | 4/1968 | Ridgway | 260—78 |
| 3,380,968 | 4/1968 | Ridgway | 57—140X |
| 3,383,368 | 5/1968 | Ridgway | 260—78 |
| 3,384,625 | 5/1968 | Reimschuessel | 57—140X |

JOHN PETRAKES, Primary Examiner

U.S. Cl. X.R.

260—78, 857; 264—290

UNITED STATES PATENT OFFICE
CERTIFICATE OF CORRECTION

Patent No. 3,557,544   Dated January 26, 1971

Inventor(s) Frank Holmes Simons

It is certified that error appears in the above-identified patent and that said Letters Patent are hereby corrected as shown below:

In column 2, line 9, "and" should be ---the---.

In column 7, line 18, "nat" should be ---not---.

In column 8, line 2, "wather" should be ---water---; line 24, "conten" should be ---content---.

In column 9, line 34, "interploymer" should be ---interpolyme

In column 10, line 53, after "s.c.f.m.", ---give--- should be inserted.

In column 11, line 62, "of" should be ---to---.

In column 13, line 51, "in" should be ---pin---.

In column 14, line 47, "a", first instance, should be ---at-- line 71, "comprised" should be ---compromised---.

In column 15, in the table, the second column under the headi the tenth number down reads "42", whereas it should read ---41---.

Signed and sealed this 21st day of December 1971.

(SEAL)
Attest:

EDWARD M. FLETCHER, JR.   ROBERT GOTTSCHALK
Attesting Officer          Acting Commissioner of Paten